(12) United States Patent
Otani

(10) Patent No.: US 9,146,450 B2
(45) Date of Patent: Sep. 29, 2015

(54) PROJECTOR

(75) Inventor: Makoto Otani, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 376 days.

(21) Appl. No.: 13/331,142

(22) Filed: Dec. 20, 2011

(65) Prior Publication Data

US 2012/0182529 A1    Jul. 19, 2012

(30) Foreign Application Priority Data

Jan. 13, 2011   (JP) .................................. 2011-004731
Oct. 26, 2011   (JP) .................................. 2011-234969

(51) Int. Cl.
*G03B 21/14* (2006.01)
*G02B 5/02* (2006.01)
*G02B 13/20* (2006.01)
*G03B 21/20* (2006.01)
*G02F 1/1335* (2006.01)

(52) U.S. Cl.
CPC .......... *G03B 21/2013* (2013.01); *G02B 5/0215* (2013.01); *G02B 5/0278* (2013.01); *G03B 21/2053* (2013.01); *G02F 1/133526* (2013.01)

(58) Field of Classification Search
CPC ...... G02B 5/0278; G02B 5/02; G02B 5/0215; G02B 5/0242; G02B 5/0221; G02B 27/48; G03B 21/005; G03B 21/006; G03B 21/008
USPC ............ 353/38, 30, 31, 94, 32; 359/599, 707, 359/619
See application file for complete search history.

(56) References Cited

U.S. PATENT DOCUMENTS

| | | | |
|---|---|---|---|
| 5,313,479 A | * | 5/1994 | Florence .......................... 372/26 |
| 7,972,009 B2 | | 7/2011 | Yamauchi et al. |
| 2007/0273849 A1 | * | 11/2007 | Takeda .......................... 353/122 |
| 2008/0187012 A1 | * | 8/2008 | Yamauchi et al. .............. 372/26 |
| 2009/0040467 A1 | * | 2/2009 | Yamauchi et al. .............. 353/38 |
| 2009/0042372 A1 | | 2/2009 | Nunan |
| 2009/0161031 A1 | * | 6/2009 | Kaise ................. 349/5 |
| 2010/0118283 A1 | | 5/2010 | Aizawa et al. |

FOREIGN PATENT DOCUMENTS

| | | |
|---|---|---|
| CN | 101363967 A | 2/2009 |
| CN | 101799619 A | 8/2010 |
| JP | 2008-122823 A | 5/2008 |
| JP | 2009-042372 A | 2/2009 |
| JP | 2010-097177 A | 4/2010 |
| JP | A-2010-197916 | 9/2010 |

* cited by examiner

*Primary Examiner* — William C Dowling
*Assistant Examiner* — Ryan Howard
(74) *Attorney, Agent, or Firm* — Oliff PLC

(57) ABSTRACT

A projector includes: a light source which emits laser light; a first diffusing section which diffuses the laser light emitted from the light source to emit a first diffused light; and a light modulation device which modulates the first diffused light emitted from the first diffusing section. The light modulation device includes a second diffusing section which diffuses the first diffused light emitted from the first diffusing section to emit a second diffused light, and diffusion intensity distribution of the second diffused light emitted from the second diffusing section is distribution which is consecutive around a central axis of the second diffused light.

15 Claims, 10 Drawing Sheets

PROJECTOR

BACKGROUND

1. Technical Field

The present invention relates to a projector.

2. Related Art

As a light source for a projector, a laser light source which is capable of obtaining high output light has gained attention. The laser light source has advantages such as superior color reproducibility, easier instant lighting and longer lifespan compared with a high pressure mercury lamp. However, since laser light is coherent light, speckles which occur due to interference are displayed on a screen, which causes the display quality to be lowered.

Technologies for solving this problem have been studied. For example, in a projector disclosed in JP-A-2010-197916, characteristics and arrangement of a light modulation device are set so that a light distribution angle with regard to one arbitrary point on a screen is equal to or larger than a predetermined angle. It is known that if the light distribution angle becomes large, it is possible to suppress lowering of the display quality due to speckles (speckle noise).

However, it is difficult to sufficiently suppress speckle noise only by setting a large light distribution angle.

For example, a fly-eye optical system or a rod optical system may be installed on an optical path of light between a diffusion device and a light modulation device so as to uniformize intensity distribution of light emitted from the diffusion device. Diffusion intensity distribution of the light emitted from such an optical system becomes discrete, and such angular distribution is maintained even after passing through the light modulation device. Thus, angular distribution of the light incident on a screen becomes noticeably ununiform, and a projection image may be deteriorated due to speckles.

SUMMARY

An advantage of some aspects of the invention is to provide a projector which is capable of reliably suppressing speckle noise.

An aspect of the invention is directed to a projector including: a light source which emits laser light; a first diffusing section which diffuses the laser light emitted from the light source to emit a first diffused light; and a light modulation device which modulates the first diffused light emitted from the first diffusing section. Here, the light modulation device includes a second diffusing section which diffuses the first diffused light emitted from the first diffusing section to emit a second diffused light, and diffusion intensity distribution of the second diffused light emitted from the second diffusing section is distribution which is consecutive around a central axis of the second diffused light.

According to this configuration, the laser light emitted from the light source is doubly diffused by the first diffusing section and the second diffusing section. Thus, the diffusion intensity distribution of the second diffused light emitted from the second diffusing section becomes consecutive distribution, which is not discrete distribution. Since such angular distribution is maintained even after being emitted from the second diffusing section, the angular distribution of the light incident on a screen becomes consecutive distribution, thereby obtaining a projection image in which speckle noise is suppressed. Accordingly, it is possible to provide a projector which is capable of reliably suppressing speckle noise.

Here, the diffusion intensity distribution refers to distribution in a plane perpendicular to an emission end face of the second diffusing section.

In the projector, the diffusion intensity distribution of the second diffused light emitted from the second diffusing section may further be distribution which includes a flat portion around the central axis of the second diffused light.

According to this configuration, the diffusion intensity distribution does not become distribution which has a protrusion in a portion from which the second diffused light having high light intensity is emitted, but becomes so-called flat-top distribution. Since the diffusion intensity distribution of the second diffused light emitted from the second diffusing section becomes the flat-top distribution, the degree of interference of speckles becomes weak in a portion which is close to the central axis of the second diffused light having high light intensity. Since such light intensity distribution is maintained even after being emitted from the second diffusing section, the light intensity distribution of the light incident on the screen becomes averaged distribution, thereby suppressing speckles from being noticeable in the projection image. Accordingly, it is possible to provide a projector which is capable of reliably suppressing speckle noise.

The projector may further include a collimating lens which emits the first diffused light emitted from the first diffusing section toward the light modulation device as a parallel light beam.

According to this configuration, the first diffused light is perpendicularly incident on the light modulation device from the first diffusing section by the collimating lens. Thus, even in a case where the light modulation device moves to a certain degree in a traveling direction of the first diffused light emitted as the parallel light beam, it is possible to sufficiently make the first diffused light from the first diffusing section be incident on the light modulation device. Accordingly, the position accuracy required when the light modulation device is disposed is alleviated, so that the assembly process becomes easy.

In the projector, the second diffusing section may be a lens array which is disposed on a side of the light modulation device from which the first diffused light is emitted.

According to this configuration, it is possible to diffuse the light with a simple configuration. Further, manufacturing of the lens array becomes easy. For example, it may be considered that the second diffusing section is disposed on a side of the light modulation device on which the first diffused light is incident. If the light modulation device has a configuration including a liquid crystal light valve, in order to efficiently use the first diffused light, it is necessary that the first diffused light be concentrated on the center of each pixel of the liquid crystal light valve while avoiding a light blocking film. In order to meet this requirement, it is necessary that a small lens which forms the lens array has a size corresponding to each pixel of the liquid crystal light valve. However, with the configuration in which the second diffusing section is disposed on the side of the light modulation device from which the first diffused light is emitted, there is no limit of the small lens which forms the lens array having the size corresponding to each pixel of the liquid crystal light valve. Thus, manufacturing of the lens array becomes easy.

In the projector, the second diffusing section may include a first lens array, a second lens array and a third lens array. Here, the first lens array may concentrate the first diffused light emitted from the first diffusing section and may emit the concentrated light toward the second lens array, the second lens array may emit the first diffused light emitted from the first lens array toward the third lens array as a parallel light beam, and the third lens array may diffuse the first diffused light emitted from the second lens array to emit the second diffused light. Further, an incident polarizing plate may be disposed on an optical path of the first diffused light between the collimating lens and the first lens array, and an emission polarizing plate may be disposed on the optical path of the first diffused light between the second lens array and the third lens array.

According to this configuration, the parallel light beam is incident on the incident polarizing plate and the emission polarizing plate. Thus, it is possible to suppress the first diffused light emitted from the first diffusing section from being inclinedly incident on the respective polarizing plates, to thereby extract the polarized light. Thus, it is possible to enhance light usage efficiency.

In the projector, the second diffusing section may be a lens array which is disposed on a side of the light modulation device on which the first diffused light is incident.

According to this configuration, it is possible to enhance light usage efficiency. For example, if the light modulation device has a configuration including a liquid crystal light valve, a small lens which forms the lens array has a size corresponding to each pixel of the liquid crystal light valve. Thus, the first diffused light is concentrated on the center of each pixel of the liquid crystal light valve while avoiding a light blocking film. Thus, it is possible to efficiently use the first diffused light.

In the projector, the light modulation device may have a configuration in which a liquid crystal layer is interposed between a pair of substrates, a reflection film which includes a reflection surface of a concave or convex shape and reflects the first diffused light may be formed on one of the pair of substrates which is disposed on a side opposite to a side on which the first diffused light is incident, and the reflection film may function as the second diffusing section.

According to this configuration, in a reflective configuration in which the light modulation device includes a reflective liquid crystal device (reflective liquid crystal light valve), it is possible to reliably suppress speckle noise without addition of a new member such as a lens array.

In the projector, the light modulation device may be a micromirror device which includes a plurality of movable micromirrors and modulates the light by controlling the movable amount of the plurality of micromirrors. Here, each micromirror may include a reflection surface of a concave or convex shape which reflects the first diffused light, and the micromirror may function as the second diffusing section.

According to this configuration, in a reflective configuration in which the light modulation device includes a digital micromirror device, it is possible to reliably suppress speckle noise without addition of a new member such as a lens array.

The projector may further include a driving device which temporally changes a region of the first diffusing section which is irradiated by the laser light.

According to this configuration, the position of the light incident on the first diffusing section is changed from moment to moment, viewed speckles are moved or a pattern of speckles is changed in a complex manner, according to the position change. As a result, the pattern of speckles is integrally averaged within a residual image time of the human eye, and thus, speckles are hardly viewed. Thus, it is possible to project an image of high quality.

In the projector, the driving device may include a motor which rotates the first diffusing section around a predetermined rotational axis.

According to this configuration, it is possible to project an image of high quality with a simple configuration. Further, a dead point (a point where movement stops for an instant) does not occur in the position of the light incident on the first diffusing section, and thus, speckles are not viewed within the residual image time of the human eye. Thus, it is possible to more reliably suppress speckle noise.

In the projector, the first diffusing section may be a hologram device.

According to this configuration, it is possible to easily control the diffusion intensity distribution of the light emitted from the first diffusing section using a diffraction phenomenon of the hologram device. Thus, it is possible to easily uniformize in-plane intensity distribution of the light incident on the second diffusing section, and to lower luminance unevenness.

In the projector, the first diffusing section may be a diffusing plate in which diffusing particles which diffuse light are dispersed therein.

According to this configuration, it is possible to diffuse the light with a simple configuration.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, exemplary embodiments of the invention will be described with reference to the accompanying drawings. The present embodiments are exemplary embodiments of the invention, which do not define the invention and may be changed in the range of the technical idea of the invention. Further, in the following drawings, scales, numbers or the like may be different between each configuration and an actual configuration for ease of description.

First Embodiment

An embodiment of a projector according to the invention will be described with reference to FIGS. 1 to 6.

In the present embodiment, a projection type projector which projects color light including image information generated by a light modulation device on a screen (a projection surface) through a projection optical system will be described as an example of a projector 1.

Figure 1:
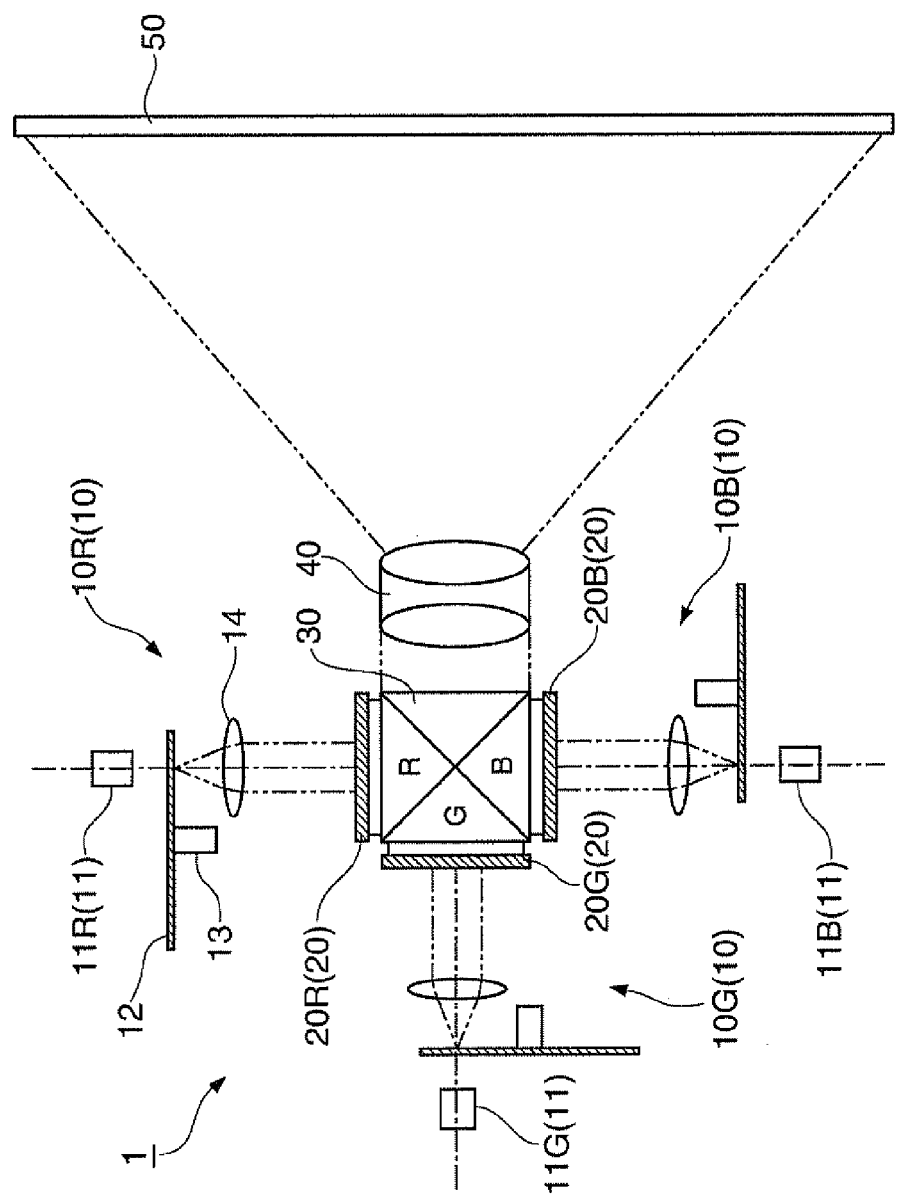
FIG. 1 is a diagram schematically illustrating an optical system of a projector according to a first embodiment of the invention.

As shown in FIG. 1, the projector 1 includes a light source device 10, a light modulation device 20, a dichroic prism 30, and a projection optical system 40.

The light source device 10 includes a red light source device 10R which emits red light, a green light source device 10G which emits green light, and a blue light source device 10B which emits blue light.

The light modulation device 20 includes a two-dimensional red light modulation device 20R which modulates the light emitted from the red light source device 10R according to the image information, a two-dimensional green light modulation device 20G which modulates the light emitted from the green light source device 10G according to the image information, and a two-dimensional blue light modulation device 20B which modulates the light emitted from the blue light source device 10B according to the image information.

The dichroic prism 30 synthesizes the respective colors of light modulated by the respective light modulation devices 20R, 20G and 20B.

The projection optical system 40 projects the light synthesized by the dichroic prism 30 on a screen 50.

When seen along an optical path of the laser light emitted from a light source 11, the light source 11, a first diffusing section 12 and a collimating lens 14 are sequentially disposed in this order in each light source device 10 (the red light source device 10R, the green light source device 10G and the blue light source device 10B). In the light source device 10, a driving device 13 is installed in each first diffusing section 12.

Figure 2:
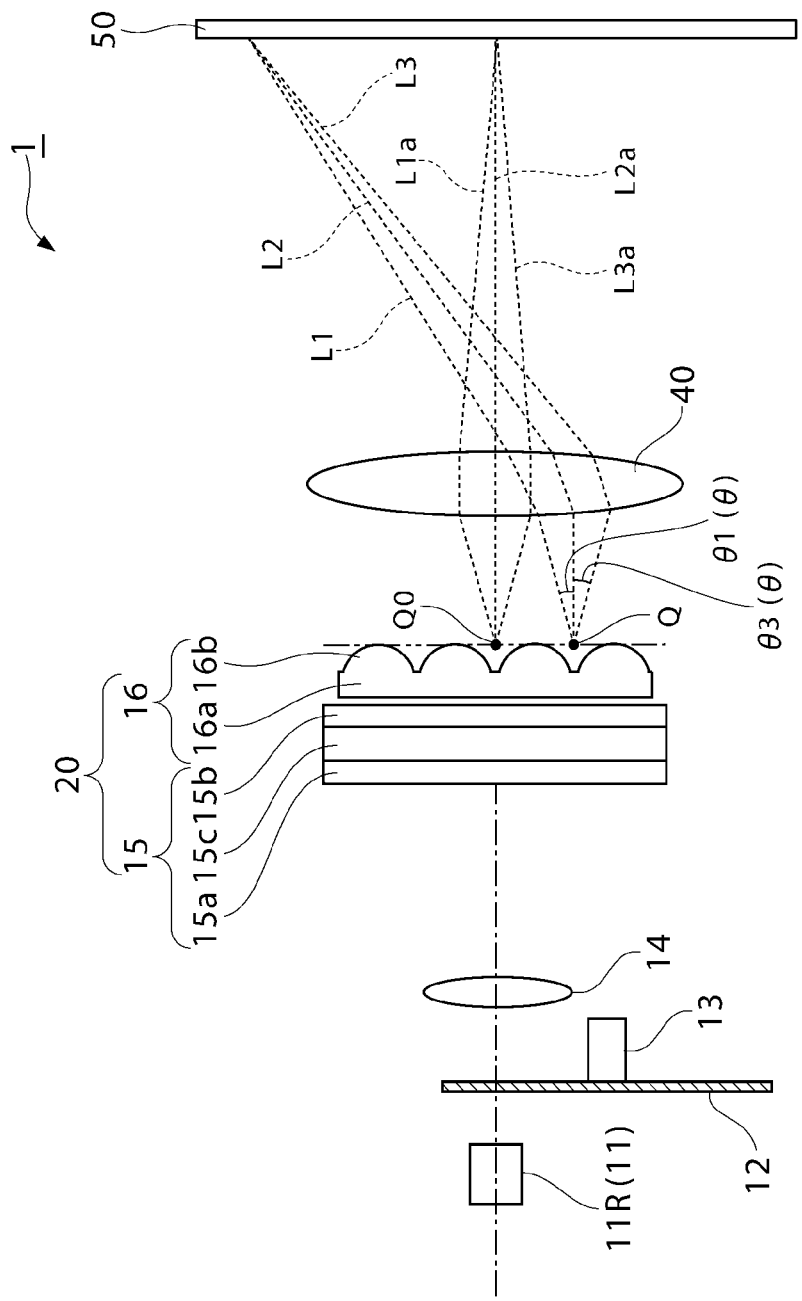
FIG. 2 is an optical path diagram illustrating a schematic configuration of the projector according to the first embodiment of the invention.

FIG. 2 is an optical path diagram illustrating a schematic configuration of the projector 1 according to the present embodiment. In FIG. 2, for ease of illustration of the optical path diagram in which the laser light emitted from the light source 11 is projected to the screen 50, the first diffusing section 12, the collimating lens 14, the light modulation device 20, the projection optical system 40, and the screen 50 are linearly disposed, and the dichroic prism is omitted. Further, for ease of description, the projection optical system 40 is shown as a single lens.

The light source 11 is a light source which emits laser light. A red light source 11R emits red laser light. A green light source 11G emits green laser light. A blue light source 11B emits blue laser light.

The first diffusing section 12 diffuses the laser light emitted from the light source 11 to emit a first diffused light. Specifically, the first diffusing section 12 has a function of enlarging the laser light emitted from the light source 11 to a light beam having a predetermined spot size. In the present embodiment, a hologram device is used as the first diffusing section 12. The first diffused light emitted from the first diffusing section 12 is incident on the collimating lens 14.

Figure 3:
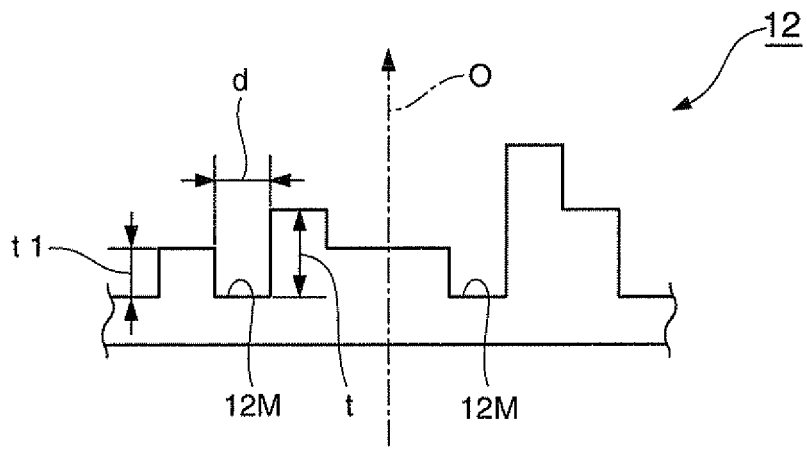
FIG. 3 is a diagram schematically illustrating a first diffusing section according to the first embodiment of the invention.

FIG. 3 is a diagram schematically illustrating the first diffusing section 12 according to the present embodiment. The first diffusing section 12 may be formed by a material which can transmit light, such as quartz (glass) or transparent synthetic resin. Further, in the present embodiment, a surface relief type hologram device is used as the first diffusing section 12. As the hologram device, for example, a computer generated hologram (hereinafter, referred to as "CGH") which is formed with a concave-convex structure which is artificially created on a glass substrate by calculation of a computer may be used. The CGH is a wavefront conversion device which converts a wavefront surface of incident light using a diffraction phenomenon. Particularly, a phase modulation type CGH can perform the wavefront conversion without substantial loss of energy of the incident light. In this way, the CGH can generate uniform intensity distribution or intensity distribution of a simple shape.

Specifically, the first diffusing section 12 has a plurality of rectangular concave portions (concave-convex structure) 12M having different depths on its surface. Further, a plurality of convex portions between the concave portions 12M also have different heights. Further, by appropriately adjusting a surface condition of the first diffusing section 12 which includes the pitch d of the concave portions 12M and the depth (height of the convex portion) t of the concave portions 12M, it is possible to assign a predetermined diffusion function to the first diffusing section 12. As a design technique of optimizing the surface condition, a predetermined calculation method (simulation method), for example, a repetition Fourier method or the like, may be used.

For example, it is preferable that the depth t1 of the first diffusing section 12 shown in FIG. 3 be approximately 100 nm, and the thickness in a direction of an optical axis O be approximately 1 μm to approximately 10 μm.

Returning to FIG. 2, the driving device 13 temporally changes a region of the first diffusing section 12 which is irradiated by the laser light. The driving device 13 includes a motor which rotates the first diffusing section 12 around a predetermined rotational axis.

The first diffusing section 12 is connected to the motor at its center and is installed to be able to rotate centering around the motor. The motor rotates at 7500 rpm, for example, when using the first diffusing section 12. In this case, the region (beam spot) on the first diffusing section 12 which is irradiated by the light moves at about 18 m/second. That is, the motor functions as position displacement means which displaces the position of the beam spot on the first diffusing section 12.

The collimating lens 14 emits the first diffused light emitted from the first diffusing section 12 toward the light modulation device 20 as a parallel light beam. The first diffused light is collimated by the collimating lens 14 to be perpendicularly incident on the light modulation device 20.

The light modulation device 20 includes a transmission type liquid crystal light valve 15 and a second diffusing section 16. The liquid crystal light valve 15 has a configuration in which a liquid crystal layer 15c is interposed between a pair of substrates (between a first substrate 15a and a second substrate 15b). The liquid crystal light valve 15 has a function of modulating the first diffused light emitted from the first diffusing section 12.

The second diffusing section 16 is a micro-lens array (lens array) which is disposed on a side (a side of the second substrate 15b which is opposite to the liquid crystal layer 15c) of the light modulation device 20 from which the first diffused light is emitted. The micro-lens array 16 is formed by disposing a plurality of micro-lenses 16b on a base 16a in a planar manner. The micro-lens array 16 diffuses the first diffused light modulated by the liquid crystal light valve 15 to be emitted as the second diffused light. The second diffused light emitted from the micro-lens array 16 is incident on the projection optical system 40 through the dichroic prism 30 (not shown).

Next, the second diffused light emitted from the micro-lens array 16 will be described.

As shown in FIG. 2, the light emitted from the collimating lens 14 is modulated by the liquid crystal light valve 15, and then is perpendicularly incident on an incident end face of the micro-lens array 16. Then, the light is emitted at a scattering angle of $\theta$ from an emission end face (virtual plane) of the micro-lens array 16. Further, the light is projected to the screen 50 through the projection optical system 40 from the dichroic prism 30 (not shown).

Here, light diffused at the point Q of the emission end face of the micro-lens array 16 will be described. Here, the light diffused by the micro-lens array 16 becomes light having a predetermined width, in which a light ray on an upper end side when seen from a planar view is represented as L1, a light ray on the central axis of the light is represented as L2, and a light ray on a lower end side is represented as L3. Further, the light diffused by the micro-lens array 16 is concentrated on an upper end side of the screen 50 through the projection optical system 40 from the dichroic prism 30 (not shown). At this time, the lengths of optical paths (optical distances) of the light ray L1, the light ray L2 and the light ray L3 from the micro-lens array 16 to the screen 50 satisfy the relationship L1<L2<L3.

The light emitted from a point Q0 of the emission end face of the micro-lens array 16 corresponding to the center of the collimating lens 14 also becomes light having a predetermined width. A light ray on an upper end side of the light emitted from the point Q0 when seen from a planar view is represented as L1a, a light ray of the central axis of the light is represented as L2a, and a light ray on the lower end side is represented as L3a. The light diffused in the center Q0 of the emission end face of the micro-lens array 16 is concentrated on the central part of the screen 50 through the projection optical system 40 which is not shown. At this time, since the lengths of optical paths of the light ray L1a and the light ray L3a are the same, an optical path difference between the light ray L1a and the light ray L2a and an optical path difference between the light ray L2a and the light ray L3a are the same.

Figure 4A:
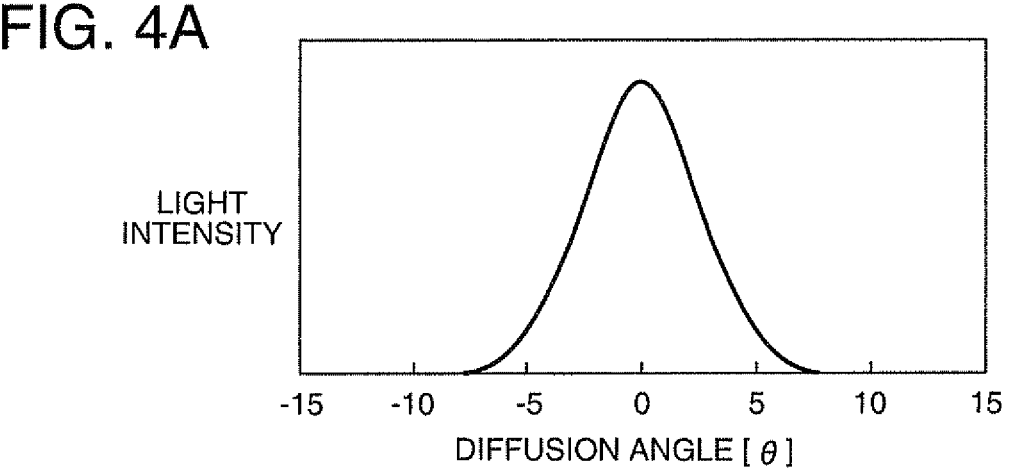
FIGS. 4A and 4B are graphs illustrating light distribution characteristics.
Figure 4B:
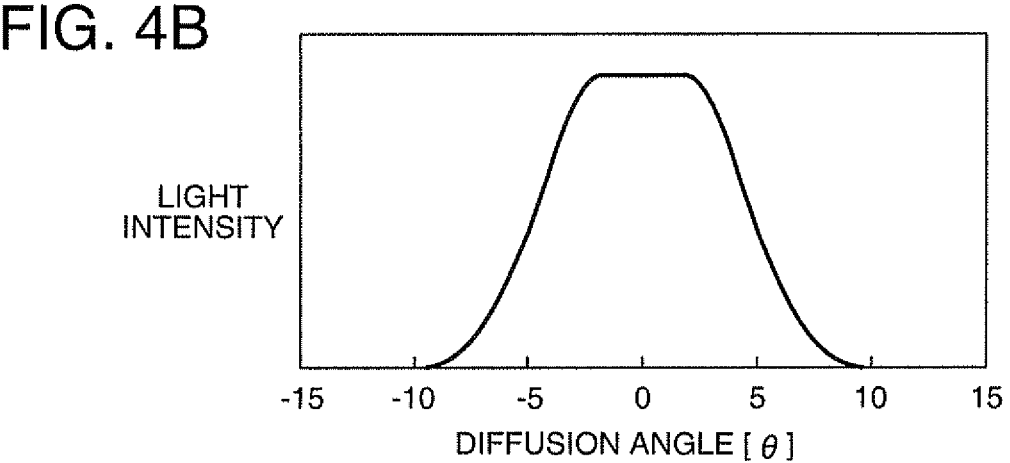

FIGS. 4A and 4B are graphs illustrating light intensity distribution in regards to a diffusion angle. In FIGS. 4A and 4B, the transverse axis represents the diffusion angle in which a central axis of luminous flux is 0°, and the longitudinal axis represents the light intensity in which the luminous flux is regulated.

FIG. 4A illustrates Gaussian distribution which is general diffusion distribution. Evaluation of the diffusion angle of the light can be performed by calculating a standard deviation for the light intensity distribution with respect to the diffusion angle, for example. As the standard deviation increases, the diffusion angle increases.

In order to sufficiently generate a speckle interference pattern to decrease speckle contrast, it is preferable that the diffusion angle be increased. Specifically, it is preferable that the ratio of the light amount (enlarged angle component) in a portion separated from the central axis of the luminous flux to the light amount of the entire luminous flux be increased. The diffusion angle or the light intensity can be adjusted by the refractive index of the micro-lens array 16, the pitch of the micro-lens array 16b, coarseness or fineness of the micro-lens array 16b, or the like. Thus, it is preferable that light distribution characteristics as shown in FIG. 4B be obtained.

FIG. 4B is an example in which the light intensity has flat-top type distribution. In the flat-top type distribution, the light intensity becomes the maximum at the central axis of the luminous flux (diffusion angle of 0°), and becomes approximately uniform around the central axis of the luminous flux (here, the diffusion angle is approximately −3° to 3°). That is, the light intensity distribution has a flat portion around the central axis of the luminous flux. If the luminous flux emitted from the micro-lens array 16 is the flat-top type, the ratio of the enlarged angle component increases compared with the Gaussian distribution shown in FIG. 4A, and the speckle contrast decreases.

Figure 5:
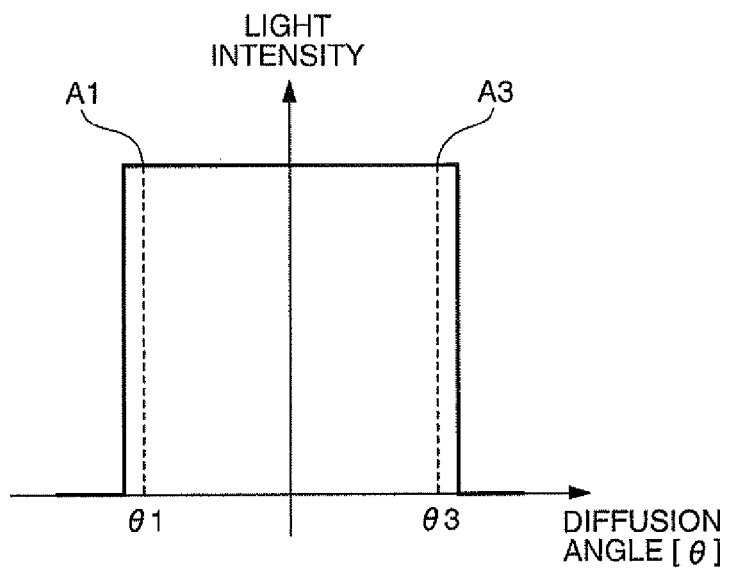
FIG. 5 is a diagram illustrating diffusion intensity distribution of light emitted from a second diffusing section according to the first embodiment of the invention.

FIG. 5 illustrates light diffusion intensity distribution when the light which is perpendicularly incident on the incident end face of the micro-lens array 16 according to the present embodiment is diffused by the micro-lens array 16. The transverse axis of FIG. 5 represents the diffusion angle of $\theta$ in the micro-lens array 16 shown in FIG. 2. The longitudinal axis represents the light intensity in which the luminous flux is regulated.

As shown in FIG. 5, the diffusion intensity distribution of the second diffused light emitted from the point Q of the micro-lens array 16 becomes rectangular distribution. The diffusion intensity distribution of the second diffused light emitted from the point Q of the micro-lens array 16 is formed so that distribution of light where the optical path difference is relatively long, that is, distribution of the light intensity A1 of the light ray L1 at the diffusion angle of $\theta1$ and distribution of the light intensity A3 of the light ray L3 at the diffusion angle of $\theta3$ becomes constant. The micro-lens array 16 is formed so that the diffusion intensity distribution of the second diffused light emitted from the point Q of the micro-lens array 16 becomes consecutive distribution around the central axis of the second diffused light. Further, the micro-lens array 16 is formed so that the diffusion intensity distribution becomes diffusion intensity distribution having a flat portion around the central axis of the second diffused light. Here, the diffusion intensity distribution is in-plane distribution perpendicular to the emission end face of the micro-lens array 16.

Further, diffusion intensity distribution of the second diffused light emitted from a concentric circle of the micro-lens array 16 also becomes the distribution as shown in FIG. 5.

Figure 6:
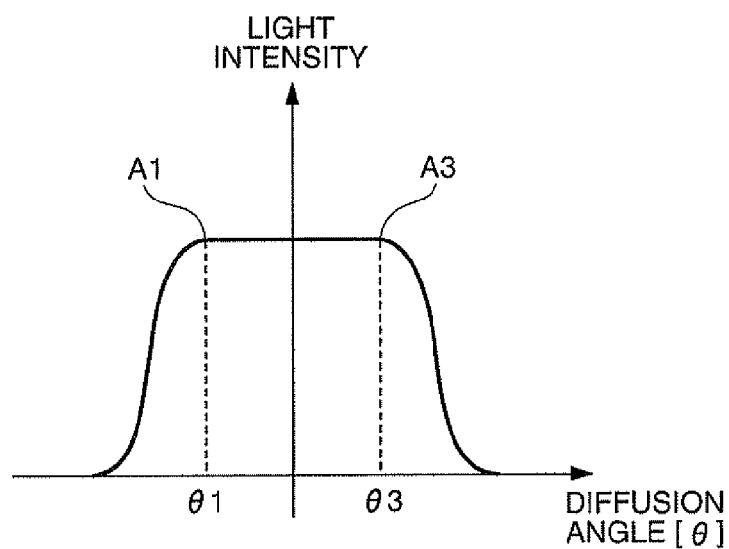
FIG. 6 is a diagram illustrating diffusion intensity distribution of light emitted from the second diffusing section according to the first embodiment of the invention.

The diffusion intensity distribution of the second diffused light emitted from the point Q of the micro-lens array 16 is not limited to the rectangular distribution as shown in FIG. 5, and side portions of the diffusion intensity distribution as shown in FIG. 6 may be smoothly changed from the maximum light intensity A1 (A3) to 0. Further, it is not necessary for the flat region as shown in FIGS. 5 and 6 to be secured between the angles $\theta1$ and $\theta3$, and any diffusion intensity distribution having a flat portion around the central axis of the light may be used. That is, the diffusion intensity distribution of the second diffused light emitted from the point Q of the micro-lens array 16 has only to be consecutive distribution around the central axis of the second diffused light and diffusion intensity distribution having a flat portion around the central axis of the second diffused light.

Returning to FIG. 1, the red light modulation device 20R, the green light modulation device 20G, and the blue light modulation device 20B are electrically connected to a signal source (not shown) such as a PC which supplies an image signal including image information, and space-modulates incident light for each pixel on the basis of the supplied image signal, to form a red image, a green image and a blue image, respectively. The light (formed image) modulated by the red light modulation device 20R, the green light modulation device 20G, and the blue light modulation device 20B is incident on the dichroic prism 30.

The dichroic prism 30 is formed by attaching four triangular prisms. A surface attached by the triangular prisms becomes an inner surface of the dichroic prism. On the inner surface of the dichroic prism, a mirror surface which reflects the red light R and transmits the green light G and a mirror surface which reflects the blue light B and transmits the green light G are formed to be perpendicular to each other. The green light G incident on the dichroic prism is emitted as it is through the mirror surface. The red light R and the blue light B which are incident on the dichroic prism are selectively reflected or transmitted on the mirror surface to be emitted in the same direction as the emission direction of the green light G. In this way, three colors of light (image) are overlapped and synthesized, and the synthesized color light is then enlarged and projected to the screen 50 by the projection optical system 40.

The projector 1 according to the present embodiment performs image display as described above.

According to the projector 1 of the present embodiment, the laser light emitted from the light source 11 is doubly diffused by the first diffusing section 12 and the second diffusing section 16. Thus, the diffusion intensity distribution of the second diffused light emitted from the second diffusing section 16 becomes consecutive distribution, not discrete distribution. By maintaining such angular distribution even after being emitted from the second diffusing section 16, the angular distribution incident on the screen becomes consecutive distribution, and a projection image in which speckle noise is suppressed is obtained. Accordingly, it is possible to provide the projector 1 capable of reliably suppressing speckle noise.

Further, since the second diffusing section 16 is disposed in the light modulation device 20, it is possible to simplify the device configuration, compared with a configuration in which the second diffusing section 16 is provided as an element which is separated from the light modulation device 20.

Further, according to this configuration, the so-called flat-top type distribution is obtained, which is not distribution in which a protruding section is included in a portion where the second diffused light having high light intensity is emitted. Since the diffusion intensity distribution of the second diffused light emitted from the second diffusing section is the flat-top type distribution, the level of speckle interference in a portion close to the central axis of the second diffused light having high light intensity becomes weak. As such light intensity distribution is maintained even after being emitted from the second diffusing section 16, distribution in which intensity distribution of the light which is incident on the screen 50 is averaged is obtained, and thus, speckles are hardly noticeable in the projection image. Accordingly, it is possible to provide the projector 1 capable of reliably suppressing speckle noise.

Further, according to this configuration, the first diffused light from the first diffusing section 12 is perpendicularly incident on the light modulation device 20 by the collimating lens 14. Thus, even in a case where the light modulation device 20 moves in a travel direction of the first diffused light emitted as the parallel light beam to some extent, it is possible to sufficiently make the first diffused light from the first diffusing section 12 be incident on the light modulation device 20. Thus, the position accuracy required when the light modulation device 20 is disposed is alleviated. Accordingly, the assembly process becomes easy.

Further, according to this configuration, it is possible to diffuse light with a simple configuration. Further, it is possible to easily manufacture the micro-lens array 16. For example, a configuration in which the micro-lens array is disposed on the side of the light modulation device 20 on which the first diffused light is incident may be considered. If the light modulation device has a configuration having the liquid crystal light valve, in order to efficiently use the first diffused light, it is necessary that the first diffused light be concentrated on the center of each pixel of the liquid crystal light valve while avoiding a light blocking film. In order to cope with such a requirement, it is necessary that a small lens which forms the micro-lens array have a size corresponding to each pixel of the liquid crystal light valve. However, with the configuration in which the micro-lens array 16 is disposed on the side of the light modulation device from which the first diffused light is emitted, there is no limit of the small lens which forms the micro-lens array 16 having the size corresponding to each pixel of the liquid crystal light valve 15. Accordingly, it is possible to easily manufacture the micro-lens array 16.

Further, according to this configuration, since the driving device 13 is included, the position of the light incident on the first diffusing section 12 is changed from moment to moment, and thus, viewed speckles are moved or a pattern of speckles is changed in a complex manner, according to this position change. As a result, the speckle pattern is integral-averaged within a residual image time of the human eye, which is difficult to view. Accordingly, it is possible to project an image of high quality.

Further, according to this configuration, since the driving device 13 includes the motor, it is possible to project the image of high quality with a simple configuration. Further, since a dead point (a point where movement stops for an instant) is not generated at the position of the light which is incident on the first diffusing section 12, speckles are not viewed within the residual image time of the human eye. Accordingly, it is possible to more reliably suppress the speckles.

Further, according to this configuration, it is possible to easily control the diffusion intensity distribution of the light emitted from the first diffusing section 12 using the diffraction phenomenon of the hologram device. Thus, it is possible to easily uniformize the in-plane luminance distribution of the light incident on the second diffusing section 16, and thus, it is possible to reduce the luminance unevenness.

Further, according to this configuration, since the configuration of the rotary diffusion plate is employed as the first diffusing section 12 and the first diffusing section 12 is close to the position of the light source 11, it is possible to reduce the size of the first diffusing section 12. Accordingly, it is possible to achieve a compact device configuration. For example, the configuration of the rotary diffusion plate may be employed as the second diffusing section, and the light source, the first diffusing section, the collimating lens and the second diffusing section may be sequentially disposed in this order along the optical path of the laser light emitted from the light source. With such a configuration, the first diffusing section and the collimating lens are disposed between the light source and the second diffusing section (rotary diffusion plate). In this case, the diffused light emitted from the first diffusing section is collimated by the collimating lens, and is incident on the second diffusing section as a light beam having a predetermined spot size. Thus, it is necessary that the second diffusing section have a size capable of allowing the light beam having the predetermined spot size to enter therein. In this regard, in the present embodiment, the configuration of the rotary diffusion plate is employed as the first diffusing section 12, and the light source 11 and the first diffusing section 12 are sequentially disposed in this order along the optical path of the laser light emitted from the light source 11. Thus, the first diffusing section 12 only has to have the size corresponding to the spot size of the laser light emitted from the light source 11. Accordingly, it is possible to reduce the size of the first diffusing section 12 and to achieve a compact device configuration.

Further, according to this configuration, since the micro-lens array is used as the second diffusing section 16 and the micro-lens array is installed in the light modulation device 20, it is easy to manufacture the device. Further, it is not necessary to prepare a specific member.

Further, according to this configuration, since the light is controlled in the vicinity of an image forming surface when seen from the projection optical system 40, consecutive angular distribution of the second diffused light emitted from the second diffusing section 16 is maintained, and the angular distribution of the light which is incident on the screen 50 becomes consecutive distribution. Accordingly, uniformity performance is enhanced. For example, the configuration that the rotary diffusion plate is used as the second diffusing section may be considered. With such a configuration, the light is controlled at a place distant from the image forming surface when seen from the projection optical system. Thus, it is difficult to maintain the consecutive angular distribution of the second diffused light emitted from the second diffusing section. In this regard, in the present embodiment, since the second diffusing section 16 is disposed on the side of the light modulation device 20 from which the first diffused light is emitted, the light is controlled in the vicinity of the image forming surface when seen from the projection optical system 40. Thus, it is easy to maintain the consecutive angular distribution of the second diffused light emitted from the second diffusing section 16. Accordingly, the angular distribution of the light incident on the screen 50 becomes the consecutive distribution, and thus, the uniformity performance is enhanced.

Further, according to this configuration, the light collimated by the collimating lens 14 is incident on the light modulation device 20. Further, the light collimated by the collimating lens 14 is controlled by the second diffusing section 16. Accordingly, the uniformity performance is enhanced.

In the projector 1 according to the present embodiment, the first diffusing section 12 uses a relief type as shown in FIG. 3, but is not limited thereto. For example, the first diffusing section may use a so-called blaze type, that is, having a triangular concave portion having inclined faces.

Further, in the projector 1 according to the present embodiment, a cross dichroic prism is used as color light synthesizing means, but is not limited thereto. As the color light synthesizing means, for example, it is possible to use means of synthesizing color light using the dichroic mirrors in a cross arrangement, or to use means of synthesizing color light using the dichoric mirrors in a parallel arrangement.

First Modified Example of Light Modulation Device According to First Embodiment

Figure 7:
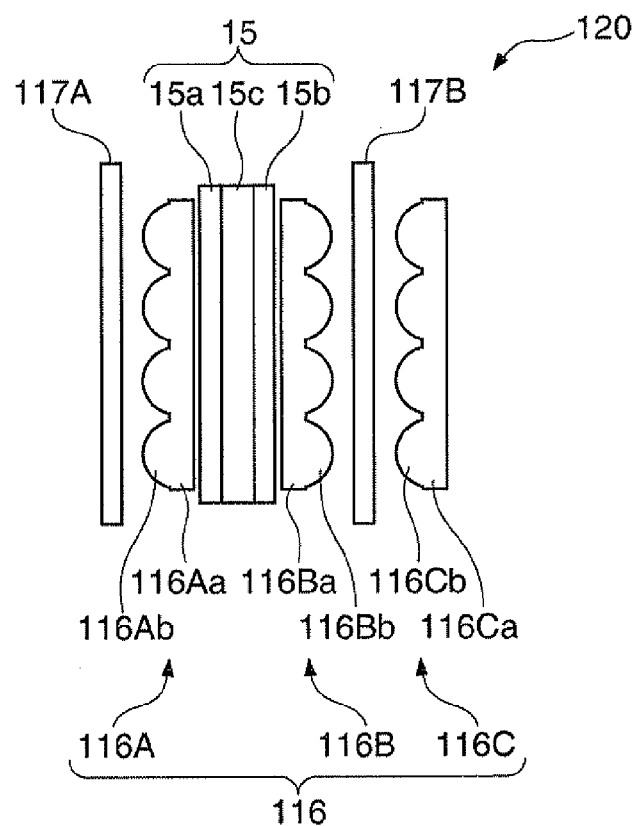
FIG. 7 is a diagram illustrating a first modified example of a light modulation device according to the first embodiment of the invention.

FIG. 7 is a diagram illustrating a first modified example of a light modulation device 120 according to the first embodiment.

As shown in FIG. 7, the light modulation device 120 of the present modified example includes the transmission type liquid crystal light valve 15 and a second diffusing section 116. Since the configuration of the liquid crystal light valve 15 is the same as that shown in FIG. 2, detailed description thereof will be omitted.

The second diffusing section 116 includes a first lens array 116A, a second lens array 116B and a third lens array 1160. An incident polarizing plate 117A is disposed on an optical path of a first diffused light between the collimating lens 14 (not shown) and the first lens array 116A. An emission polarizing plate 117B is disposed on an optical path of the first diffused light between the second lens array 116B and the third lens array 116C.

The first lens array 116A is a micro-lens array which is disposed on a side (a side of the first substrate 15$a$ which is opposite to the liquid crystal layer 15$c$) of the liquid crystal light valve 15 on which the first diffused light is incident. The micro-lens array 116A is formed by disposing a plurality of micro-lens arrays 116A$b$ on a base 116A$a$ in a planar manner. The micro-lens array 116A concentrates the first diffused light which is collimated by the collimating lens 14 (not shown) and is polarized by the incident polarizing plate 117A in a predetermined direction to be emitted toward the liquid crystal light valve 15. The first diffused light emitted from the micro-lens array 116A is incident on the second lens array 116B through the liquid crystal light valve 15.

The second lens array 116B is a micro-lens array which is disposed on the side (a side of the second substrate 15$b$ which is opposite to the liquid crystal layer 15$c$) of the liquid crystal light valve 15 from which the first diffused light is emitted. The micro-lens array 116B is formed by disposing a plurality of micro-lens arrays 116B$b$ on a base 116B$a$ in a planar manner. The micro-lens array 116B emits the first diffused light which is modulated by the liquid crystal light valve 15 toward the emission polarizing plate 117B as a parallel light beam. The first diffused light emitted from the micro-lens array 116B is incident on the third lens array 116C through the emission polarizing plate 117B.

The third lens array 116C is a micro-lens array which is disposed on a side of the emission polarizing plate 117B from which the first diffused light is emitted. The micro-lens array 116C is formed by disposing a plurality of micro-lens arrays 116C$b$ on a base 116C$a$ in a planar manner. The micro-lens array 116C diffuses the first diffused light which is polarized by the emission polarizing plate 117B in a predetermined direction to be emitted as the second diffused light. The second diffused light emitted from the micro-lens array 116C is projected on the screen 50 through the projection optical system 40 from the dichroic prism 30 (not shown).

According to the configuration of the present modified example, the parallel light beam is incident on the incident polarizing plate 117A and the emission polarizing plate 117B. Thus, it is possible to suppress the first diffused light emitted from the first diffusing section 12 from being inclinedly incident on the polarizing plates 117A and 117B, to thereby extract the polarized light. Thus, it is possible to enhance light usage efficiency.

Figure 8:
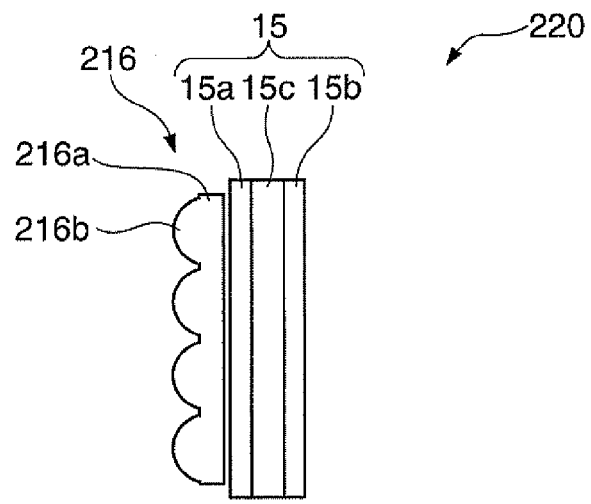
FIG. 8 is a diagram illustrating a second modified example of the light modulation device according to the first embodiment of the invention.

Second Modified Example of Light Modulation Device According to First Embodiment FIG. 8 is a diagram illustrating a second modified example of a light modulation device 220 according to the first embodiment.

As shown in FIG. 8, the light modulation device 220 of the present modified example includes the transmission type liquid crystal light valve 15 and a second diffusing section 216. Since the configuration of the liquid crystal light valve 15 is the same as that shown in FIG. 2, detailed description thereof will be omitted.

The second diffusing section 216 is a micro-lens array (lens array) which is disposed on a side (a side of the first substrate 15a which is opposite to the liquid crystal layer 15c) of the light modulation device 220 on which the first diffused light is incident. The micro-lens array 216 is formed by disposing a plurality of micro-lens arrays 216b on a base 216a in a planar manner. The micro-lens array 216 diffuses the first diffused light which is collimated by the collimating lens 14 (not shown) to be emitted as the second diffused light. The second diffused light emitted from the micro-lens array 216 is projected on the screen 50 through the projection optical system 40 (not shown) from the liquid crystal light valve 15.

According to the configuration of the present modified example, it is possible to enhance the light usage efficiency. For example, in the case of the configuration in which the light modulation device 220 has the liquid crystal light valve 15, the micro-lens array 216b which forms the micro-lens array 216 is set to the size corresponding to each pixel of the liquid crystal light valve. Thus, the first diffused light is concentrated on the center of each pixel of the liquid crystal light valve 15 while avoiding a light blocking film. Accordingly, it is possible to use the first diffused light with high efficiency.

First Modified Example of First Diffusing Section According to First Embodiment

Figure 9:
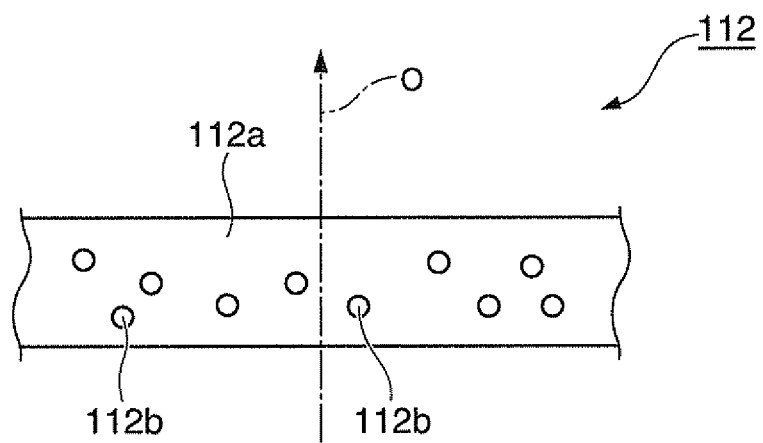
FIG. 9 is a diagram illustrating a first modified example of the first diffusing section according to the first embodiment of the invention.

FIG. 9 is a diagram illustrating a first modified example of a first diffusing section 112 according to the first embodiment.

As shown in FIG. 9, the first diffusing section 112 of the present modified example is a diffusion plate in which diffusion particles 112b which diffuse light are scattered therein. The diffusion plate 112 is formed by scattering the diffusion particles 112b having light diffusion characteristics in a base 112a made of a light transmission material such as transparent resin. The thickness of the first diffusing section 112 (base 112a) is approximately 1 to 2 mm.

According to the configuration of the present modified example, it is possible to diffuse light with a simple configuration.

Second Embodiment

Figure 10:
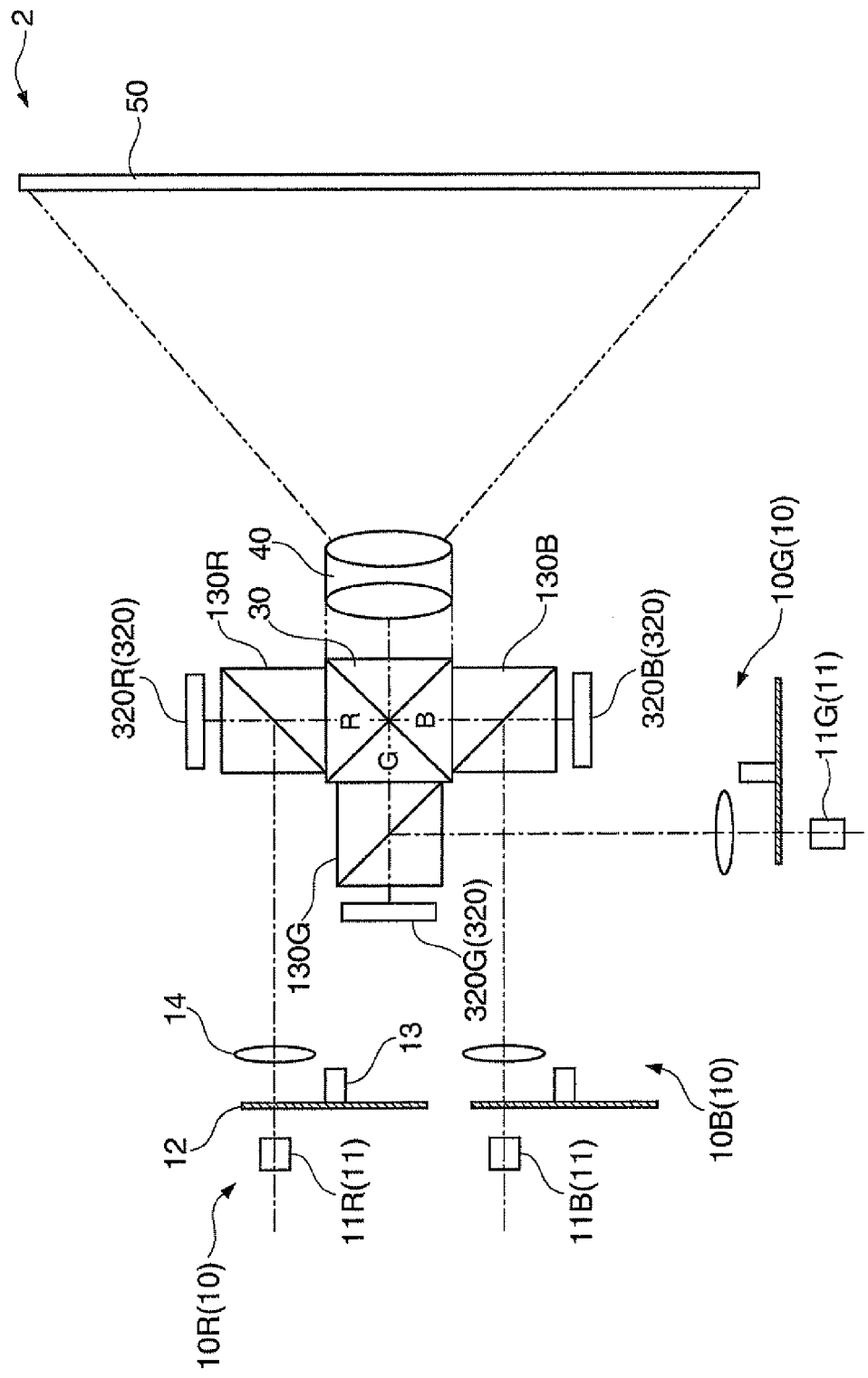
FIG. 10 is a diagram schematically illustrating a projector according to a second embodiment of the invention.

FIG. 10 is a diagram schematically illustrating a projector 2 according to a second embodiment of the invention, corresponding to FIG. 1.

As shown in FIG. 10, the projector 2 according to the present embodiment is different from the projector 1 according to the above-described first embodiment in that a polarizing beam splitter 130 is disposed on an optical path between the light source device 10 and the dichroic prism 30 and a light modulation device 320 is a reflection type liquid crystal light valve. Since other configurations are the same as the above-described configurations, the same reference numerals are given to the same elements as in FIG. 1, and detailed description thereof will be omitted.

As shown in FIG. 10, the projector 2 includes the light source device 10, the polarizing beam splitter 130, the light modulation device 320, the dichroic prism 30 and the projection optical system 40.

The polarizing beam splitter 130 includes a red polarizing beam splitter 130R, a green polarizing beam splitter 130G, and a blue polarizing beam splitter 130B.

The red polarizing beam splitter 130R has the functions of reflecting the light emitted from the red light source device 10R to reach the red light modulation device 120R, and transmitting the light modulated by the red light modulation device 120R to reach the dichroic prism 30.

The green polarizing beam splitter 130G has the functions of reflecting the light emitted from the green light source device 10G to reach the green light modulation device 120G, and transmitting the light modulated by the green light modulation device 120G to reach the dichroic prism 30.

The blue polarizing beam splitter 130B has the functions of reflecting the light emitted from the blue light source device 10B to reach the blue light modulation device 120B, and transmitting the light modulated by the blue light modulation device 120B to reach the dichroic prism 30.

The light modulation device 320 includes a two-dimensional red light modulation device 320R which modulates the light reflected by the red polarizing beam splitter 130R according to image information, a two-dimensional green light modulation device 320G which modulates the light reflected by the green polarizing beam splitter 130G according to the image information, and a two-dimensional blue light modulation device 320B which modulates the light reflected by the blue polarizing beam splitter 130E according to the image information.

Figure 11:
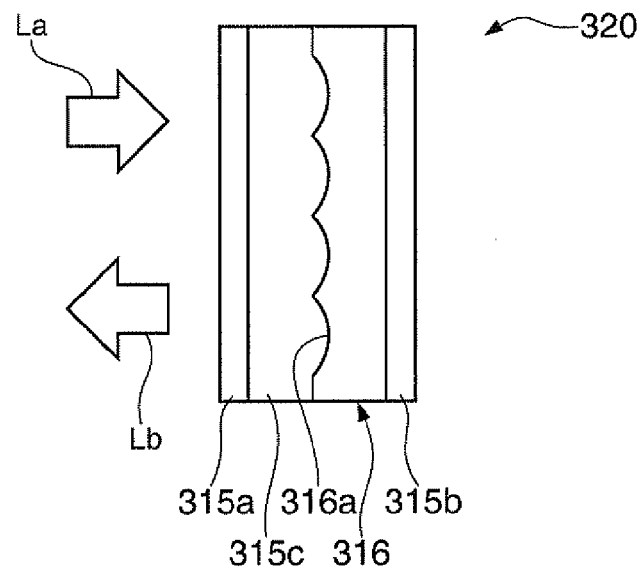
FIG. 11 is a diagram schematically illustrating a light modulation device according to the second embodiment of the invention.

FIG. 11 is a diagram schematically illustrating the light modulation device 320 according to the second embodiment.

As shown in FIG. 11, the light modulation device 320 according to the present embodiment is a transmission type liquid crystal light valve and has a configuration in which a liquid crystal layer 315c is interposed between a pair of substrates (between a first substrate 315a and a second substrate 315b). A reflection film 316 which includes a convex reflection surface 316a and reflects the first diffused light La is formed on one (second substrate 315b) of the pair of substrates which is disposed on a side opposite to a side on which the first diffused light La is incident. In the present embodiment, the reflection film 316 functions as a second diffusing section.

The light reflected by the red polarizing beam splitter 130R, the green polarizing beam splitter 130G and the blue polarizing beam splitter 130B is modulated by the red light modulation device 320R, the green light modulation device 320G and the blue light modulation device 320B. Further, the first diffused light La which is incident on the red light modulation device 320R, the green light modulation device 320G and the blue light modulation device 320E is diffused by the reflection film 316 and is emitted toward the red polarizing beam splitter 130R, the green polarizing beam splitter 130G and the blue polarizing beam splitter 130B as the second diffused light Lb.

Returning to FIG. 10, the light (formed image) modulated by the red light modulation device 320R, the green light modulation device 320G and the blue light modulation device 320B passes through the red polarizing beam splitter 130R, the green polarizing beam splitter 130G and the blue polarizing beam splitter 130B to be incident on the dichroic prism 30.

Further, three colors of light (images) are overlapped and synthesized by the dichroic prism 30, and the synthesized color light is then enlarged and projected to the screen 50 by the projection optical system 40.

The projector 2 according to the present embodiment performs image display as described above.

According to the projector 2 of the present embodiment, in the reflection type configuration in which the light modulation device 320 is the reflection type liquid crystal device (reflection type liquid crystal light valve), it is possible to reliably suppress speckle noise without addition of a new member such as a lens array.

Figure 12:
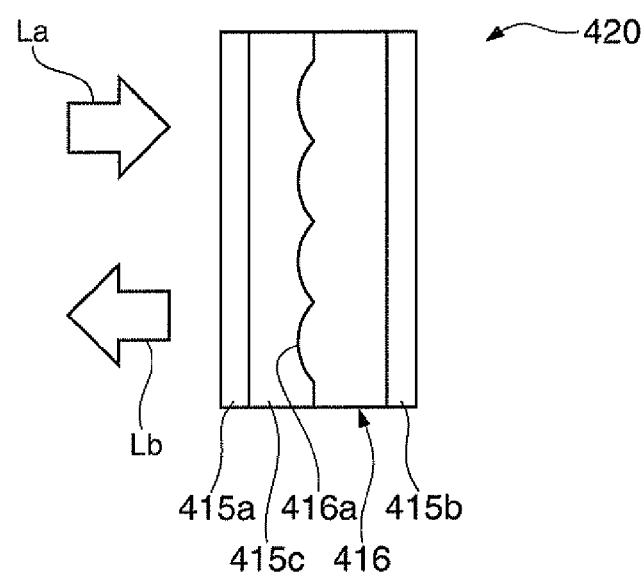
FIG. 12 is a diagram schematically illustrating a first modified example of the light modulation device according to the second embodiment of the invention.

First Modified Example of Light Modulation Device According to Second Embodiment FIG. 12 is a diagram illustrating a first modified example of a light modulation device 420 according to the second embodiment.

As shown in FIG. 12, the light modulation device 420 according o the present modified example is a transmission type liquid crystal light valve and has a configuration in which a liquid crystal layer 415c is interposed between a pair of substrates (between a first substrate 415a and a second substrate 415b). A reflection film 416 which includes a convex reflection surface 416a and reflects the first diffused light La is formed on one (second substrate 415b) of the pair of substrates which is disposed on a side opposite to a side on which the first diffused light La is incident. In the present embodiment, the reflection film 416 functions as a second diffusing section.

In the configuration of the present modified example, in the reflection type configuration, it is possible to reliably suppress speckle noise without addition of a new member such as a lens array.

Third Embodiment

Figure 13:
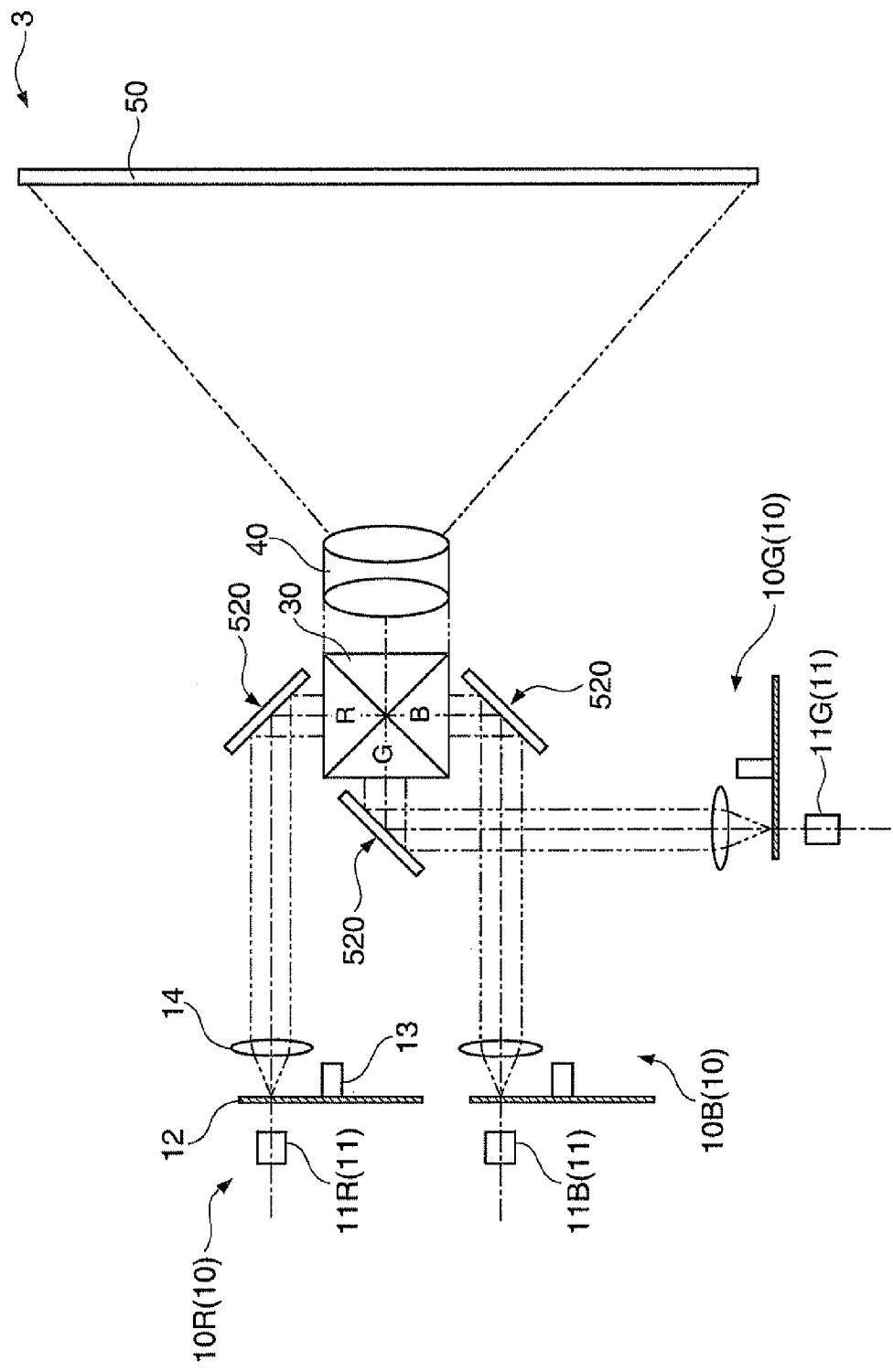
FIG. 13 is a diagram schematically illustrating an optical system of a projector according to a third embodiment of the invention.

FIG. 13 is a diagram schematically illustrating a projector 3 according to a third embodiment of the invention, corresponding to FIG. 11.

As shown in FIG. 13, the projector 3 according to the present embodiment is different from the projector 2 according to the above-described second embodiment in that a micromirror type light modulation device 520 is disposed on an optical path between the light source device 10 and the dichroic prism 30. Since other configurations are the same as the above-described configurations, the same reference numerals are given to the same elements as in FIG. 11, and detailed description thereof will be omitted.

As shown in FIG. 13, the projector 3 includes the light source device 10, the light modulation device 520, the dichroic prism 30 and the projection optical system 40.

Figure 14:
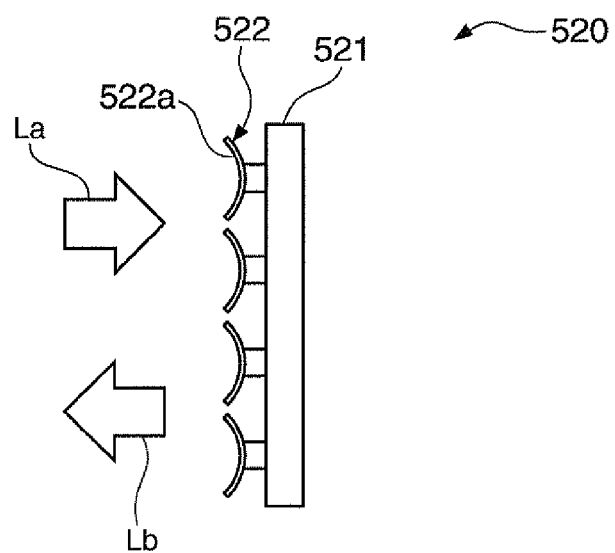
FIG. 14 is a diagram illustrating a light modulation device according to the third embodiment of the invention.

FIG. 14 is a diagram schematically illustrating the light modulation device 520 according to the third embodiment.

As shown in FIG. 14, the light modulation device 520 according to the present embodiment is a DMD (digital micromirror device) (trademark of TI corporation). The projector 3 according to this embodiment employs a DLP (Digital Light Processing) method using the DMD and a dedicated signal processing technique.

In the DMD 520, a plurality of movable micromirrors 522 are arranged on a substrate 521 in a matrix form. The DMD 520 is a device which modulates light by controlling the movable amount of the plurality of micromirrors 522. Specifically, the DMD 520 divides, by switching an inclination direction of the plurality of micromirros 522, light incident in an incident direction which is inclined in one direction with respect to a front direction into an on-state light ray in the front direction and an off-state light ray in the inclination direction and reflects them, to thereby display an image. The DMD 520 reflects the light incident on the micromirror 522 which is inclined in one inclination direction in the front direction by the micromirror 522 to be set to the on-state light ray, and reflects the light incident on the micromirror 522 which is inclined in the other inclination direction in the inclined direction by the micromirror to be set to the off-state light ray. The DMD 520 absorbs the off-state light ray by a light absorption plate, and generates the image by a bright display through refection in the front direction and a dark display through reflection in the inclined direction. The DMD 520 sequentially modulates the red light, green light and blue light emitted from the light source device 10.

The micromirror 522 includes a concave reflection surface 522a which reflects the first diffused light La. In the present embodiment, the micromirror 522 functions as the second diffusing section.

The first diffused light La which is incident on the red light source device 10R, the green light source device 10G and the blue light source device 10B is diffused by the micromirror 522 and is emitted toward the dichroic prism 30 as the second diffused light Lb.

Returning to FIG. 13, the light (formed image) modulated by the DMD 520 is incident on the dichroic prism 30. Further, three colors of light (images) are overlapped and synthesized by the dichroic prism 30, and the synthesized color light is then enlarged and projected to the screen 50 by the projection optical system 40.

The projector 3 according to the present embodiment performs image display as described above.

In the projector 3 according to the present embodiment, in the reflection type configuration in which the light modulation device 520 is the digital micromirror device, it is possible to reliably suppress speckle noise without addition of a new member such as a lens array.

First Modified Example of Light Modulation Device According to Third Embodiment

Figure 15:
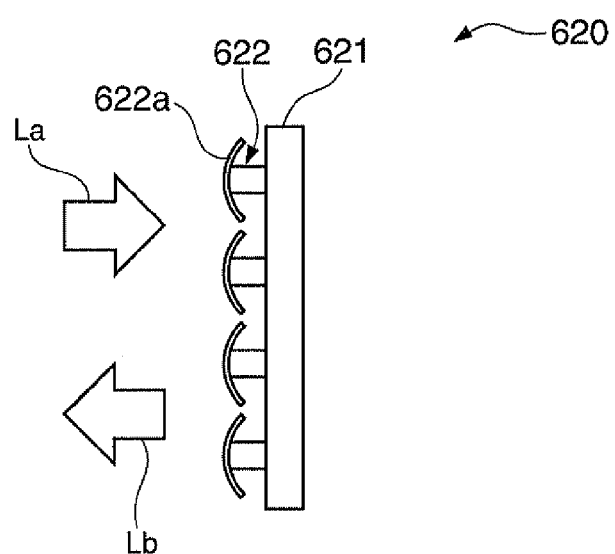
FIG. 15 is a diagram schematically illustrating a first modified example of the light modulation device according to the third embodiment of the invention.

FIG. 15 is a diagram illustrating a first modified example of a light modulation device 620 according to the third embodiment.

As shown in FIG. 15, the light modulation device 620 according to the present modified example is a DMD (digital micromirror device) (trademark of TI corporation), and has a configuration in which a plurality of movable micromirrors 622 are arranged on a substrate 621 in a matrix form. The micromirror 622 includes a convex reflection surface 622a which reflects the first diffused light La. In the present embodiment, the micromirror 622 functions as the second diffusing section.

In the configuration of the present modified example, in the reflection type configuration, it is possible to reliably suppress speckle noise without addition of a new member such as a lens array.

The invention can be applied to a front projection type projector in which a projection image is projected from an observation side and a rear projection type projector in which a project image is projected from a side opposite to the observation side.

In the respective embodiments, the examples in which the illumination device of the invention is applied to the projector have been described, but the invention is not limited thereto. For example, it is possible to apply the illumination device of the invention to other optical equipment (for example, optical disc devices, backlights for vehicles, illumination devices, or the like).

The entire disclosure of Japanese Patent Application Nos. 2011-4731, filed Jan. 13, 2011 and 2011-234969, filed Oct. 26, 2011 are expressly incorporated by reference herein.

What is claimed is:

1. A projector comprising:
   a light source that emits laser light;
   a first diffusing section that diffuses the laser light emitted from the light source to emit a first diffused light;
   a light modulation device that, according to image information, modulates the first diffused light emitted from the first diffusing section; and
   a projection optical system,
   the light modulation device including a second diffusing section that is configured to diffuse the first diffused light to emit the diffused light as a second diffused light, a scattering angle of the second diffused light between the second diffusing section and the projection optical system being larger than a scattering angle of the first diffused light that is incident on the second diffusing section;
   the projection optical system being disposed in a posterior position of the second diffusing section; and
   diffusion intensity distribution of the second diffused light emitted from the second diffusing section being consecutive around a central axis of the second diffused light.

2. The projector according to claim 1,
   wherein the diffusion intensity distribution of the second diffused light emitted from the second diffusing section further includes a flat portion around the central axis of the second diffused light.

3. The projector according to claim 1,
   further comprising a collimating lens which emits the first diffused light emitted from the first diffusing section toward the light modulation device as a parallel light beam.

4. The projector according to claim 3,
   wherein the second diffusing section is a lens array which is disposed on a side of the light modulation device from which the first diffused light is emitted.

5. The projector according to claim 3,
   wherein the second diffusing section includes a first lens array, a second lens array and a third lens array,
   wherein the first lens array concentrates the first diffused light emitted from the first diffusing section and emits the concentrated light toward the second lens array,
   wherein the second lens array emits the first diffused light emitted from the first lens array toward the third lens array as a parallel light beam,
   wherein the third lens array diffuses the first diffused light emitted from the second lens array to emit the second diffused light,
   wherein an incident polarizing plate is disposed on an optical path of the first diffused light between the collimating lens and the first lens array, and
   wherein an emission polarizing plate is disposed on the optical path of the first diffused light between the second lens array and the third lens array.

6. The projector according to claim 3,
   wherein the second diffusing section is a lens array which is disposed on a side of the light modulation device on which the first diffused light is incident.

7. The projector according to claim 3,
   wherein the light modulation device has a configuration in which a liquid crystal layer is interposed between a pair of substrates,
   wherein a reflection film which includes a reflection surface of a concave or convex shape and reflects the first diffused light is formed on one of the pair of substrates which is disposed on a side opposite to a side on which the first diffused light is incident, and
   wherein the reflection film functions as the second diffusing section.

8. The projector according to claim 3,
   wherein the light modulation device is a micromirror device which includes a plurality of movable micromirrors and modulates the light,
   wherein each micromirror includes a reflection surface of a concave or convex shape which reflects the first diffused light, and
   wherein the micromirror functions as the second diffusing section.

9. The projector according to claim 1,
   further comprising a driving device which temporally changes a region of the first diffusing section which is irradiated by the laser light.

10. The projector according to claim 9,
    wherein the driving device includes a motor which rotates the first diffusing section around a predetermined rotational axis.

11. The projector according to claim 1,
    wherein the first diffusing section is a hologram device.

12. The projector according to claim 1,
    wherein the first diffusing section is a diffusing plate in which diffusing particles which diffuse light are dispersed therein.

13. The projector according to claim 1, further comprising a dichroic unit that is optically positioned between the light modulation device and the projection optical system.

14. A projector comprising:
    a light source which emits laser light,
    a first diffusing section which diffuses the laser light emitted from the light source to emit a first diffused light,
    a light modulation device which modulates the first diffused light emitted from the first diffusing section, and
    a collimating lens which emits the first diffused light emitted from the first diffusing section toward the light modulation device as a parallel light beam,
    wherein the light modulation device includes a second diffusing section which diffuses the first diffused light emitted from the first diffusing section to emit a second diffused light,
    wherein diffusion intensity distribution of the second diffused light emitted from the second diffusing section is a distribution which is consecutive around a central axis of the second diffused light,
    wherein the second diffusing section includes a first lens array, a second lens array and a third lens array,
    wherein the first lens array concentrates the first diffused light emitted from the first diffusing section and emits the concentrated light toward the second lens array,
    wherein the second lens array emits the first diffused light emitted from the first lens array toward the third lens array as a parallel light beam,
    wherein the third lens array diffuses the first diffused light emitted from the second lens array to emit the second diffused light,
    wherein an incident polarizing plate is disposed on an optical path of the first diffused light between the collimating lens and the first lens array, and
    wherein an emission polarizing plate is disposed on the optical path of the first diffused light between the second lens array and the third lens array.

15. A projector comprising:
a light source which emits laser light,
a first diffusing section which diffuses the laser light emitted from the light source to emit a first diffused light,
a light modulation device which modulates the first diffused light emitted from the first diffusing section, and
a collimating lens which emits the first diffused light emitted from the first diffusing section toward the light modulation device as a parallel light beam,
wherein the light modulation device includes a second diffusing section which diffuses the first diffused light emitted from the first diffusing section to emit a second diffused light,
wherein diffusion intensity distribution of the second diffused light emitted from the second diffusing section is a distribution which is consecutive around a central axis of the second diffused light,
wherein the light modulation device is a micromirror device which includes a plurality of movable micromirrors and modulates the light,
wherein each micromirror includes a reflection surface of a concave or convex shape which reflects the first diffused light, and
wherein the micromirror functions as the second diffusing section.

* * * * *